A. S. FOSTER.
MILK STRAINER.
APPLICATION FILED MAR. 16, 1914.
1,116,260.  Patented Nov. 3, 1914.
Fig. I.
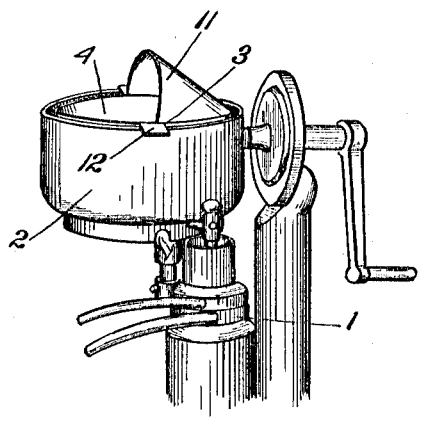
Fig. II.
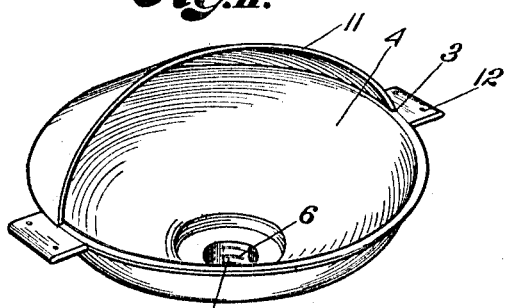
Fig. III.
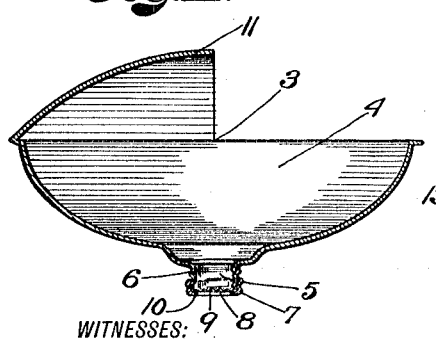
Fig. IV.
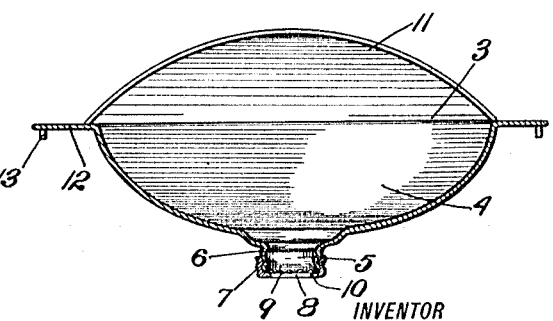
WITNESSES:
Lynn A. Robinson.
Arthur W. Caps.
INVENTOR
A. S. Foster.
BY
Arthur C. Brown,
ATTORNEY

UNITED STATES PATENT OFFICE.

AURA S. FOSTER, OF BEAVER, OKLAHOMA.

MILK-STRAINER.

1,116,260. Specification of Letters Patent. Patented Nov. 3, 1914.

Application filed March 16, 1914. Serial No. 824,958.

*To all whom it may concern:*

Be it known that I, AURA S. FOSTER, a citizen of the United States, residing at Beaver city, in the county of Beaver and State of Oklahoma, have invented certain new and useful Improvements in Milk-Strainers; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to milk strainers, and more particularly to a strainer for use in connection with cream separators, or the like, upon which the strainer is supported prior to the delivery of the milk therethrough; the principal object of the present invention being to provide a device of this character through which milk may be strained without splashing adjacent objects, and which is provided with means for confining it at its supporting body. In accomplishing this object I have provided improved details of structure; the preferred forms of which are illustrated in the accompanying drawings, wherein:—

Figure I is a perspective view of the strainer, and illustrating its use in combination wtih the bowl of a cream separator. Fig. II is a perspective view of the strainer. Fig. III is a central, vertical section of the strainer. Fig. IV is a central, vertical section of the strainer, on a line perpendicular to the section Fig. III.

Referring more in detail to the drawings:—1 designates a cream separator of any common make, having a supply bowl 2 which supports a strainer 3 embodied by my invention. The strainer comprises a body member 4 of bowl form, having at the bottom a central aperture 5 surrounded by a down-turned tubular extension 6 which is helically crimped to receive a similarly crimped cap 7 adapted to screw on the extension 6 from the under side. The cap 7 is provided with a central aperture 8 which is covered by a section of gauze 9, which fits within the cap and is held between the rim of the extension 6 and the inturned flange 10 of the cap 7.

In order to prevent any overflowing as the milk is poured into the pan, the body 4 is provided with an upwardly curved cover 11, which is secured to the rim of the body 4 half way around its circumference and covers one-half of the bowl, leaving a large opening for receiving the milk.

At each side of the body 4, and formed integral with the rim, are horizontal wings 12, having near their ends downwardly pointed pins 13. The arms are adapted for supporting the pan on the rim of a separator bowl, or other vessel, and the function of the pins is to keep the arms from sliding off their supports.

It will be seen that a strainer of this kind can be used in connection with large or small vessels, and the straining element can be removed and washed or replaced as often as necessary.

Having thus described my invention, what I claim as new therein, and desire to secure by Letters-Patent, is:—

1. A strainer comprising a bowl-shaped body member having a tubular extension in its base, a cover member secured to said body and arched over substantially one-half of the top thereof, a screened cap removably mounted on said tubular extension, and wings secured to and projecting laterally from the upper edge of said body member for pivotally supporting the strainer.

2. A strainer comprising a bowl-shaped body member having a tubular extension in its base, a screened cap removably mounted on said tubular extension, a cover arched over substantially one-half of said body and rigidly secured to the upper edge thereof and wings secured to the upper edge of said body and projecting laterally therefrom in line with the front edges of said cover, for pivotally supporting the strainer.

3. A strainer comprising a bowl-shaped body member having a tubular extension in its base, a screened cap removably mounted on said tubular extension, a cover tightly secured to the upper edge of and arched over substantially one-half of said body to form a chamber substantially equal to the capacity of the body, and narrow wings on said body in line with the edges of said cover for pivotally supporting the strainer.

4. A strainer comprising a bowl-shaped body member having a screened aperture in its base, a cover tightly secured to the upper edge of and arched over substantially one-half of said body to form a chamber substantially equal to the capacity of said body member, and oppositely disposed supporting wings on said body in line with the edges of said cover, whereby the strainer may be revolved to a vertical position, to change the position of said chambers.

In testimony whereof I affix my signature in presence of two witnesses.

AURA S. FOSTER.

Witnesses:
JOHN W. SAVAGE,
J. C. RING.

Copies of this patent may be obtained for five cents each, by addressing the "Commissioner of Patents, Washington, D. C."